United States Patent [19]

Baba

[11] Patent Number: 4,791,420
[45] Date of Patent: Dec. 13, 1988

[54] RADAR DETECTOR/SECURITY DEVICE FOR AUTOMOBILES

[75] Inventor: Yoshihiko Baba, Noda, Japan

[73] Assignee: The Weston Corporation, Tokyo, Japan

[21] Appl. No.: 139,027

[22] Filed: Dec. 29, 1987

[30] Foreign Application Priority Data

Jul. 23, 1987 [JP] Japan ................ 62-182187

[51] Int. Cl.⁴ .................. G01S 7/42; G01S 13/56
[52] U.S. Cl. .............................. 342/20; 342/28; 340/554
[58] Field of Search ............... 342/20, 27, 28; 340/554

[56] References Cited

U.S. PATENT DOCUMENTS 4,090,195  5/1978  Guennou et al. ........... 340/554
4,275,390  6/1981  Heywang et al. ........... 340/554
4,295,131 10/1981  Bonori et al. ............. 342/28
4,565,446  1/1986  Close .................... 342/28
4,622,553 11/1986  Baba et al. .............. 342/20
4,668,952  5/1987  Imazeki et al. ........... 342/20

Primary Examiner—T. H. Tubbesing
Assistant Examiner—Mark Hellner
Attorney, Agent, or Firm—Oblon, Fisher, Spivak, McClelland & Maier

[57] ABSTRACT

A radar detector/security device for cars in which the antenna structure of a radar wave detection circuit that drives a warning means when a radar wave is detected is utilized to radiate a local oscillation signal and receive a signal reflected from a dielectric body. The Doppler shift produced by the movement of the dielectric body is detected as a beat component of the local oscillation signal. This beat component causes an incorporated security function to activate a security circuit. The radar detection circuit or the security circuit can be selectively utilized.

4 Claims, 4 Drawing Sheets

BSW⁺
Power Supply

Waveform at Pi

Waveform at Po

RADAR DETECTOR/SECURITY DEVICE FOR AUTOMOBILES

BACKGROUND OF THE INVENTION

1. Field of the Invention

This invention relates to a radar detector/security device for automobiles, and particularly to a radar detector/security device providing an existing radar detector installed in a motor vehicle with a security function utilizing the Doppler effect for the non-contact detection of a moving dielectric body such as a human being.

2. Prior Art Statement

It has become the fashion to attach various accessories and auxiliary electrical equipments to fourwheeled motor vehicles. Particularly in the United States of America, radar detectors for detecting the radar waves used in automobile speed traps and security devices known as car burglar alarms for preventing theft from an unattended car or even theft of the car itself are popular.

As the object of detection of these devices differs, they have of course been separate, independent products. An example of a security device for detecting illegal intrusion into the interior of a car is one in which when the user is to leave the car with the key in the ignition, he leaves a power switch on so that any subsequent opening of the car door is detected and a horn or other such warning means installed in the car is sounded.

The circuit block diagram of a typical commercial radar detector 10 for detecting radar waves is shown in FIG. 1. This radar detector 10 consists of a horn antenna structure 12 having a microwave antenna or a wave guide structure continuing on therefrom, and a radar wave detection circuit 11 which can be incorporated as a purely electrical circuit.

In the United States, the frequencies of radar waves (microwaves) used by police in vehicle speed traps generally belong to the X-band or K-band. These radar waves $f_R$ are detected by the horn antenna 13 of the horn antenna structure 12.

Behind the horn antenna 13 are connected a mixing chamber 14 and a first local oscillation chamber 15 in that order. In the first local oscillation chamber 15 is incorporated a negative-characteristic diode 16 formed of a Gunn diode, IMPATT diode or the like for outputting a first local oscillation frequency signal $f_L$.

Incorporated in the mixing chamber 14 is a beat detection diode 17 such as a Schottky barrier diode or the like for detecting the beat frequency of the first local oscillation frequency signal $f_L$ and the radar wave $f_R$ entering the horn antenna 13.

With the above arrangement, when it is to be made possible to detect both the X-band and the K-band, a harmonics mixing system is used, as is well known. With the center frequency of the X-band being 10.525 GHz and that of the K-band 24.150 GHz, with respect to the center frequencies, both bands have an equal zone allowance of ±100 MHz. Thus, if 11.558 GHz is selected as the center frequency of the first local oscillation frequency signal $f_L$ generated by the negative-characteristic diode 16, and with respect to the X-band the beat frequency of the subject fundamental wave and the input radar wave $f_R$ is adopted, and with respect to the K-band the beat frequency of the second higher harmonic of the fundamental wave $f_L$, i.e. 11.558×2=23.116 GHz, a first intermediate frequency signal $f_{IF1} = 1033 \pm 100$ MHz can be obtained from the output from the beat detection diode 17 via a first intermediate frequency signal amplifier 18 that is of equal value for both bands.

This is the principle of harmonics mixing. The first intermediate frequency signal $f_{IF1}$ thus obtained is further beaten down by an adjustable and scannable second local oscillation frequency signal produced by a second local oscillator 20 at a second mixer 19, which is a solid-state electronic circuit, converting it to a fixed second intermediate frequency signal $f_{IF2}$ which is in the order of several tens of megahertz, and is then applied to a signal detection circuit 22 via an amplifier 21.

The aforementioned radar detector 10 is of the type referred to as superheterodyne or double-conversion, and there is also a single-conversion type in which frequency conversion takes place once within the wave guide (in the chamber).

Although the above-described conventional radar detector has room for improvement with respect to details of ease of use and greater compactness, there are few problems with the basic principle.

However, it should be noted that external leakage of the first local oscillation frequency signal $f_L$ has to be kept to a minimum. While this also depends on the design, adjustment and suchlike of a driving circuit (driver) 29 that drives the diode 16 to provide the first local oscillation frequency signal $f_L$, unless this is done successfully it becomes a source of electrical interference with other electrical equipment.

In particular, with the inherent object of a radar detector involving its operation while the vehicle is in motion, the generation of such interfering waves could set up interference and noise in on-board computers and other such important electrical circuitry, which could result in major problems. Among conventional products there have in fact been those which exhibit considerable leakage because they have not been well adjusted.

There have also been problems with the operating principles of conventional security devices. For example, some such devices were unable to detect an illegal intrusion unless a car door was opened, and were therefore unable to detect an intruder who gained entry to the car by breaking a window.

Also, conventional warning devices are arranged generally so that they are turned off when the door key is used to unlock the car door, so that the warning device can be shut off even if the door is illegally unlocked by means of a piece of wire or the like, and therefore will not sound a warning.

OBJECT AND SUMMARY OF THE INVENTION

It is an object of this invention to provide a radar detector/security device for a car by using at least part of the configuration of a radar detector to configure a security device in which the aforementioned types of drawbacks have been eliminated in order to integrate radar detector and security device into a single product so as to thereby reduce the economic and space burdens incurred by each device being separate, promoting rationalization.

To attain the above object the car radar detector/security device according to this invention comprises:

a horn antenna structure having a horn antenna and a mixing chamber in which an applied local oscillation frequency signal is mixed with a radar wave picked up by the horn antenna to output an intermediate frequency signal, which horn antenna structure is adapted to radiate the local oscillation frequency signal to the outside via the horn antenna and output a low frequency signal which is a beat of a feedback frequency signal reflected from a moving dielectric body and the aforementioned local oscillation frequency signal;

a radar wave detection circuit that detects the aforementioned intermediate frequency signal and operates a warning means;

a security circuit that detects the aforementioned low frequency signal and operates an annunciating means; and a mode switching means for selecting either the radar detection circuit or the security circuit.

This enables the user (the driver) to choose as desired between a radar detection mode and a security mode for monitoring the presence or absence of an illegal intruder entering the car. When for example the radar detection mode is selected by means of a mode switch such as a power switch or the like, the circuit that detects the low frequency signal output from the horn antenna structure, i.e., the security circuit, is switched off and the radar detection circuit is switched on. As a result, it becomes possible to detect just the intermediate frequency signal resulting from the mixing in the horn antenna structure mixing chamber of the radar wave picked up by the horn antenna with the local oscillation frequency signal, and to produce a warning.

Other objects and features of the invention will become clear from the following detailed description made with reference to the accompanying drawings.

DETAILED DESCRIPTION OF THE PREFERRED EMBODIMENT

Figure 1:
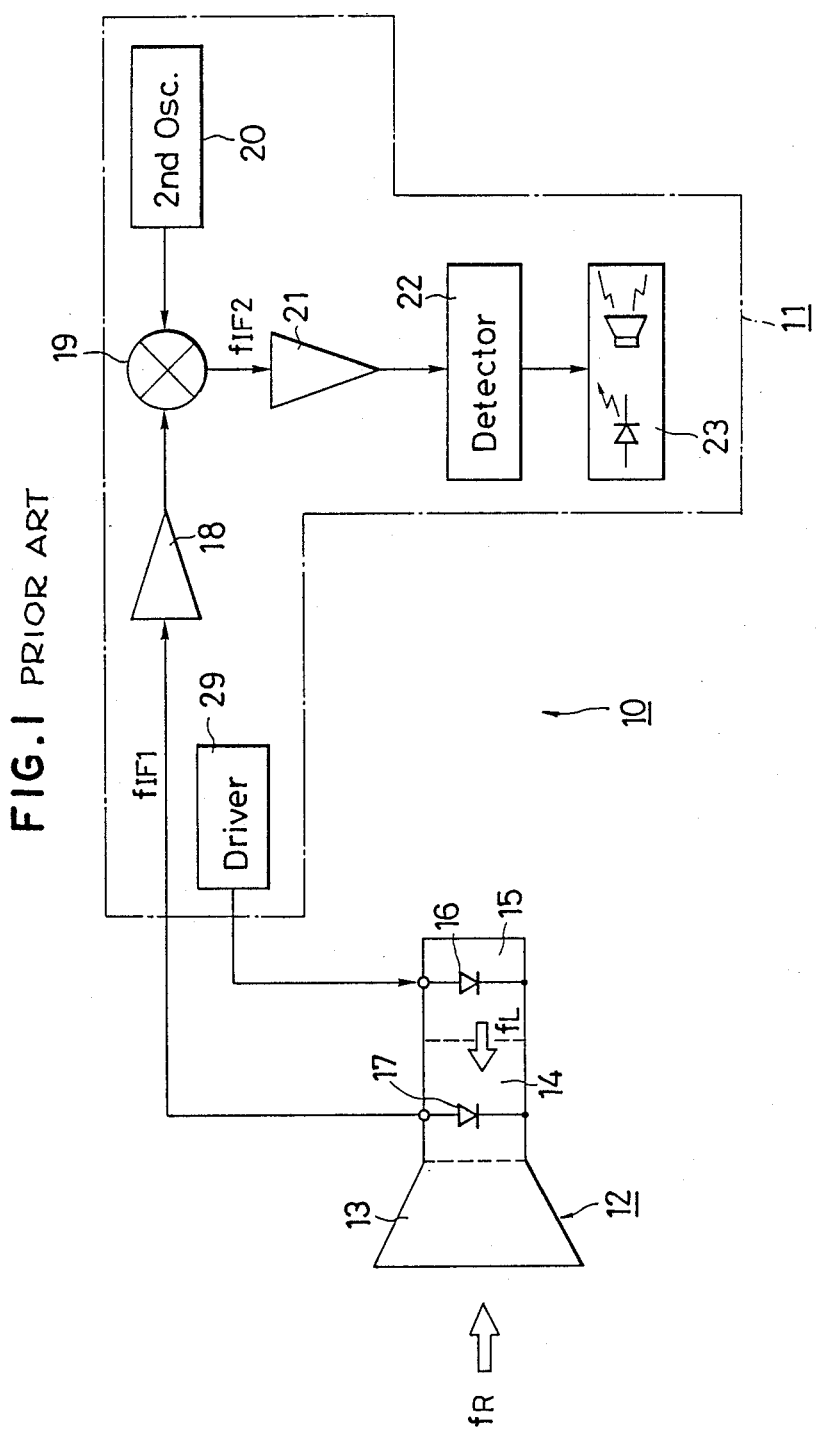
FIG. 1 is an outline drawing of the configuration of a conventional radar detector.
Figure 2:
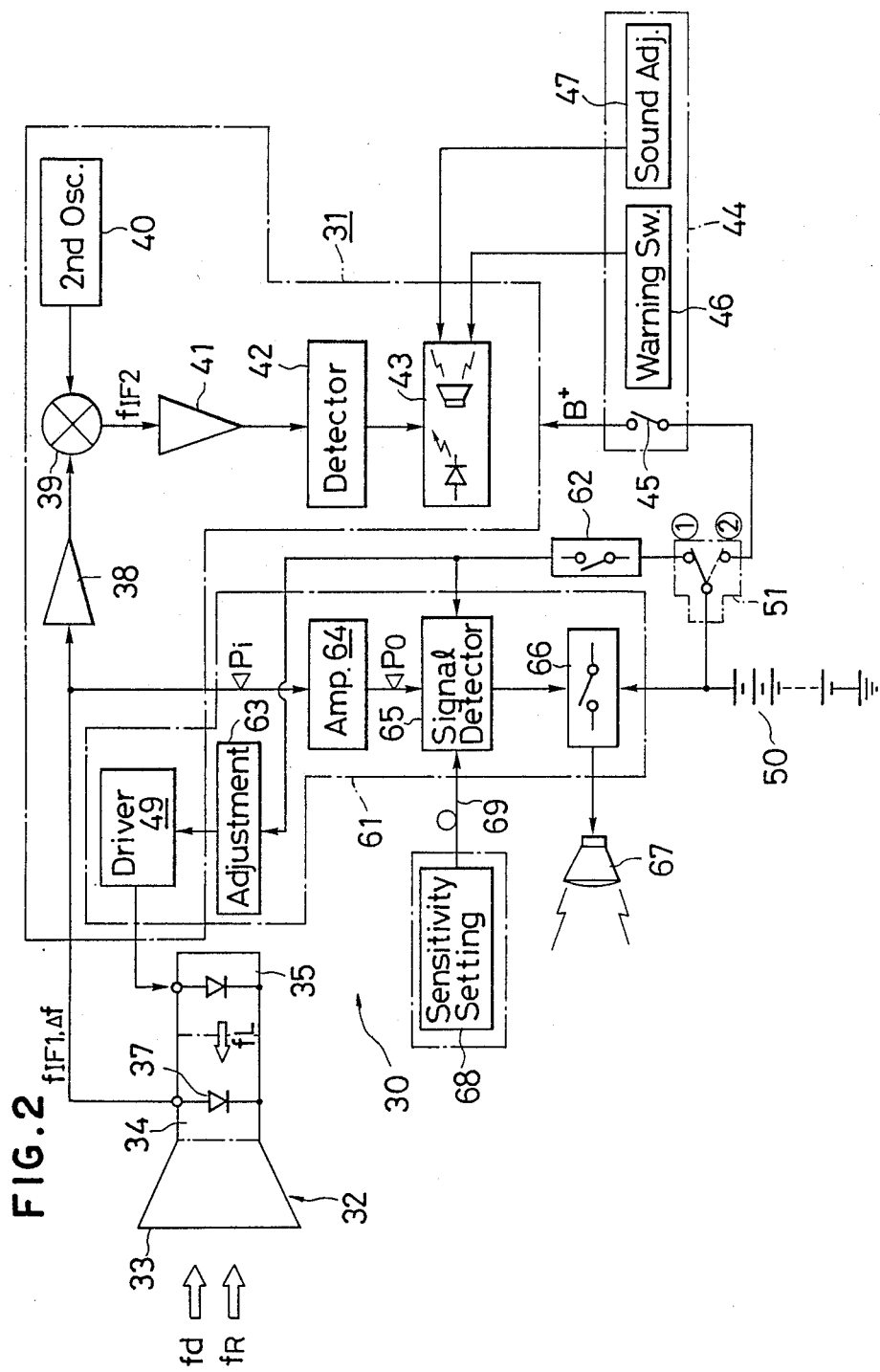
FIG. 2 is an outline drawing of the configuration of a preferred embodiment of a radar detector/security device for a car in accordance with the present invention.

FIG. 2 shows a preferred embodiment of a radar detector/security device for cars made in accordance with the present invention.

A horn antenna structure 32 is provided with a horn antenna 33, a waveguide-structure mixing chamber 34 leading therefrom, and a local oscillation chamber 35 within which is an oscillation negative-characteristic diode 36 such as a Gunn diode or an IMPATT diode for supplying a first local oscillation frequency signal to the mixing chamber 34.

As will be described hereinbelow, incorporated in the mixing chamber 34 is a beat detector diode 37 such as a Schottky barrier diode (SBD) or the like which is capable of outputting a first intermediate frequency signal $f_{IF1}$ as a result of the beating of a radar wave $f_R$ picked up by the horn antenna 33 with a first local oscillation frequency signal $f_L$ or the double higher harmonic $2.f_L$ thereof, or the low frequency signal $\Delta f$ that is a beat of the first local oscillation frequency signal $f_L$ and the reflected wave $f_d$ thereof.

The diode 36 that produces the first local oscillation frequency signal $f_L$ is driven by a drive circuit 49 which may include a bias power source. This drive circuit 49 is common to the radar wave detection circuit 31 and the security circuit 61. However, other circuits are provided on just one or the other of the radar detection circuit 31 and security circuit 61 that are operated selectively.

To explain starting with the radar detection circuit 31, in this embodiment the principal portion thereof is of the double conversion type. The output of the beat detection diode 37 provided in the mixing chamber 34 of the horn antenna structure 32 is applied, via a first intermediate frequency signal amplifier 38, to a second mixer 39 that is a solid-state circuit, where it is mixed with an adjustable and scannable second local oscillation frequency signal that is produced by a second local oscillator 40, beaten down to a lower frequency and converted to a second intermediate frequency signal $f_{IF2}$, after which it is supplied to a signal detection circuit 42 via a second intermediate frequency signal amplifier 41.

The specific frequency relationship has already been described in the foregoing. To reiterate, when a harmonics mixing system is employed in order to have both the X-band and the K-band detectable, with the center frequency of the X-band being 10.525 GHz and that of the K-band 24.150 GHz, with respect to the center frequencies, both bands have an equal zone allowance of $\pm 100$ MHz. Thus, if 11.558 GHz is selected as a center frequency of a first local oscillation frequency signal $f_L$ generated by a negative-characteristic diode 36, and with respect to the X-band the beat frequency of the subject fundamental wave and the input radar wave $f_R$ is adopted, and with respect to the K-band the beat frequency of the second higher harmonic of the fundamental wave $f_L$, i.e. $11.558 \times 2 = 23.116$ GHz, a first intermediate frequency signal $f_{IF1} = 1033 \pm 100$ MHz can be obtained from the output from a beat detection diode 37 via a first intermediate frequency signal amplifier 38 that is of equal value for both bands.

The first intermediate frequency signal $f_{IF1}$ thus obtained is further beaten down by an adjustable and scannable second local oscillation frequency signal produced by a second local oscillator 40 at a second mixer 39, which is a solid-state electronic circuit, converting it to a fixed second intermediate frequency signal $f_{IF2}$ which is in the order of several tens of megahertz, and is then applied to a signal detection circuit 42 via an amplifier 41.

In this embodiment a battery 50 mounted in the vehicle is used as the power source for each of the circuit systems. A change-over switch 51 which changes the power supply route from the battery 50 is employed as a mode switching means. In the drawing the change-over switch 51 is provided at the position indicated by the phantom lines, i.e., at radar detection mode selection contact point position ②. Also, a dedicated power switch 45 is provided, preferably in an operating section 44 that is operated as desired by the user, as described later; closing the dedicated power switch 45 causes power B+ from the battery 50 to be supplied only to the radar wave detection circuit 31.

The radar wave detection circuit 31 is thus enabled by the above-described mechanism to detect a radar wave $f_R$ impinging on the horn antenna 33 of the horn antenna structure 32. Should a radar wave $f_R$ actually be picked up and as a result a second intermediate frequency signal $f_{IF2}$ of the state order of amplitude be applied to the signal detection circuit 42, an operation instruction signal is sent from the signal detection circuit 42 to a warning means 43, informing the driver that a radar wave has been detected.

The warning means 43 may be formed of a loudspeaker or other appropriate sound generating means and light-emitting diodes or other such light-emitting display means, similarly to existing radar detectors that are known. It may also be provided with an operating section 44 that includes a warning mode switching means 46 enabling selection of visual or sound warning means, or both, and which also permits both means to be switched off, and a sound level adjustment means 47 consisting of an attenuator, for example, for adjusting the sound level of the sound generating means.

A single-conversion type radar detection circuit in which frequency conversion takes place once within the wave guide (in the chamber 34) may be used instead of the superheterodyne or double-conversion type radar detection circuit 31, and in the same way as the radar detection circuit 31 of the present invention.

However, whichever is used, preferably adjustment of a driving circuit 49 is used for ensuring as far as possible that, in the radar detection mode, minimal external leakage of the first local oscillation frequency signal $f_L$ output by the local oscillation negative-characteristic diode 36.

When a user operates the mode switching/power change-over switch 51, switching to the contact position ① indicating the security mode, the supply of power to the radar wave detection circuit 31 is stopped, and as the circuit is de-energized a security circuit 61 is energized, enabling its operation.

In this embodiment, the power supply to the security circuit 61 becomes power source $B_{SW}+$ which controls the on-off states of the DC power output by the battery 50 by an appropriate means such as, for example, a self-exciting inverter circuit 62. This will be explained later; first, in the security circuit 61 the mechanism of the non-contact detection of a moving dielectric body utilizing the Doppler effect will be described.

Figure 3:
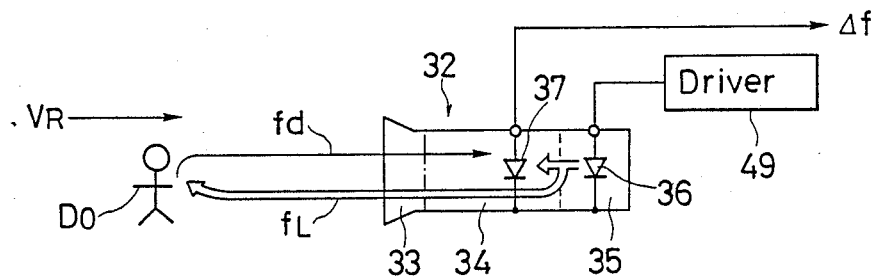
FIG. 3 is an explanatory drawing of the operating principle in the security mode.

The principle is illustrated in FIG. 3. Unlike in the case of the above radar detection mode, in the selection of the security mode, an adjustment circuit 63 (not shown in FIG. 3) provided in the security circuit 61 shown in FIG. 2 is used for the drive circuit 49, preferably so that the amount of the local oscillation frequency signals $f_L$ leaking to the outside from the horn antenna 33 increases to some extent.

However, as in the security mode monitoring of the vehicle interior is the object, although the balance with a detection circuit 65, described later, is also of consequence, expressed as an absolute amount, a large degree of leakage is not required, therefore a level is not required which will be such as to affect surrounding devices outside the vehicle in which the device is mounted. In some cases it is not specifically necessary to change the drive conditions of the local oscillation diode 36 from those used in the above radar detection mode, and in such cases there is no special need for the adjustment circuit 63.

Whichever is the case, when the first local oscillation frequency signal $f_L$ radiated to the outside from the horn antenna 33 of the horn antenna structure 32 is reflected back by a human body or other such dielectric body $D_O$, moving at a velocity $V_R$, and returns to the horn antenna 33, the feedback signal frequency $f_d$ will have undergone a Doppler shift $\Delta f$ relative to the original frequency $f_L$.

The difference in the frequency value between the reflected wave $f_d$ and the radiated wave $f_L$, i.e., the frequency shift component $\Delta f$ evidenced in the output of the beat detection diode 37, will be in accordance with the following known Doppler equation (1).

$$\Delta f = \frac{2 \cdot V_R}{C} \cdot f_L \ (C: \text{Speed of light}) \quad (1)$$

Therefore, if the frequency $f_L$ is for example in the aforementioned order of 11 GHz, even if the dielectric body is moving directly toward the horn antenna 33 at a velocity $V_R$ in the order of 15 cm/sec, the Doppler frequency shift $\Delta f$ as calculated from the above equation (1) will be in the order of several tens of hertz. Even if a person is walking very slowly, for example at a velocity of $V_R=2$ km/h (55.5 cm/sec), a Doppler shift $\Delta f$, as calculated using equation (1), in the order of 40 Hz can be obtained. This clearly shows that an object moving at quite a low speed is sufficiently detectable. In the case of a dielectric body $D_O$ that is moving at a tangent to the central axis of the horn antenna 33, the velocity $V_R$ used in the above computation formula would of course have to be multiplied by the reciprocal of the cosine of the actual velocity of movement, with respect to the subject angle. Even then, however, in general the frequency shift component $\Delta f$ obtained will be sufficiently large.

In the security circuit 61 of the embodiment utilizing this principle, the output of the beat detection diode 37 that extracts the said Doppler frequency shift component $\Delta f$ is preferably received by an amplifier 64 provided with a low pass filter, and the output thereof is supplied to the signal detection circuit 65 that detects the signal of the aforementioned low order of frequency.

The upper limit frequency of the low pass filter is decided in accordance with a maximum shift frequency value $\Delta f$ of equation (1) which generally is the maximum within the expected range of movement velocity of the dielectric body that forms the detection object, and is usually no more than several hundred hertz. However, as the level of a moving body detection frequency signal $\Delta f$ is not very high, it is usually preferable for the amplifier 64 provided with a low pass filter to have a minimum gain in the order of several tens of decibels.

With this arrangement, when a low frequency signal $\Delta f$ within the significant frequency range is detected by the low frequency signal detection circuit 65, in this embodiment a switching circuit 66 is operated, and operating power from the battery 50 is supplied to an annunciating means 67 comprised of the vehicle's horn or a siren or the like that produces an appropriate signal of audible frequency and volume.

As such, with the monitoring by the radar detector/security device 30 in accordance with the present invention, as well detection of a person's illegal entry into the vehicle interior, the opening of a door of the vehicle or the breaking of a window of the vehicle can also be detected, thereby providing full security functionality.

Thus, by the user's selective operation of the mode change-over switch 51 the apparatus can be used as a radar detector and as a security device. In addition, the frequency bands utilized by the respective mode circuits 31 and 61 are entirely separated from each other so there is no risk of mutual interference arising, making this an extremely desirable accessory.

Accuracy of the above operations to satisfy the requirements of both detection objectives in the modes is related to the installation positioning of the horn antenna structure 32 and its orientation, which require some consideration as to what is appropriate in each case, which depends on the place of use and the interior structure of the vehicle.

Figure 4:
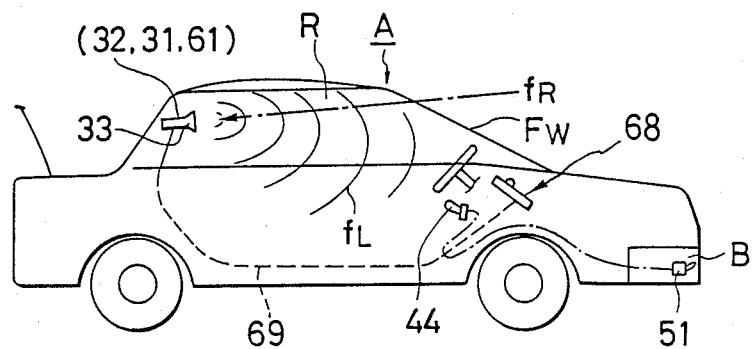
FIGS. 4 and 5 are explanatory drawings showing the installation and an example of use when specific portions of the device interior have been made into a remote control unit form.

An example arrangement is shown in FIG. 4. Here, in the passenger compartment R of a vehicle A, a housing structure housing the horn antenna structure 32, the radar wave detection circuit 31 and the security circuit 61 may be suspended to the rear of the backseats, or placed on a rear panel behind the back seats, with at least the horn antenna 33 facing to the front. In the radar detection mode, a radar wave $f_R$ beamed at the vehicle will pass through the windshield FW and be picked up by the forward-facing horn antenna 33, while in the security mode the entire passenger compartment R of the car is monitored from the rear thereof.

Another way, not illustrated, is to prepare an appropriate attachment, for example to rotatably attach at least the said horn antenna structure 32 of the radar detector/security device apparatus, and the said housing, to the sun visor located above the driver's seat so that the horn antenna 33 can be turned to face to the front (out of the car) or to the rear (into the car).

Regarding the switching of modes, it is preferable that the mode change-over switch 51 be located outside the passenger compartment, and in an unobtrusive place, such as behind the fender B in the example shown in FIG. 4. The reason is that if it is located inside the passenger compartment R and the driver operates the mode change-over switch 51 to switch to the security mode prior to leaving the vehicle A, the movements of the driver as he leaves the vehicle will cause the security circuit 61 to go into operation.

It can be seen then that if the mode change-over switch 51 is provided outside the passenger compartment, after getting out of the car and locking the car door the driver is able to set the switch to the security mode, and when he returns he can switch off the security mode (in this embodiment this will mean the radar detection mode is switched on at this point; however, a switch may be provided with a position that allows both modes to be switched off) and then open the door and get in the car.

Some resistance may be felt to thus providing the change-over switch 51 outside the car. It may also be undesirable from the viewpoint of corrosion and other such external factors. In such cases, even if the same manual switch is used, a delay circuit may be incorporated. With such an arrangement, when the driver is going to get out of the car and he switches on the security mode by means of a change-over switch 51 that is provided in the passenger compartment, the power from the battery 50 is not supplied to the security circuit 61 immediately but only after a predetermined time $T_1$ has elapsed. The length of the said time $T_1$ will be set in accordance with the time it is estimated the driver will require to open the door and completely exit from the car, after he has operated the switch 51.

Similarly, the security circuit 61 is arranged so that even when a moving body $D_O$ is detected when the moving-body-detection capability of the security circuit 61 has been enabled, a warning will not be sounded immediately by the annunciating means 67, but after the lapse of a second delay time $T_2$.

Arranged thus, the legitimate user (driver) can reenter the car and set the mode change-over switch 51 to the contact position ② or the both-mode-off position (not shown) in the period of time the supply of power to the security circuit 61 is off, so the warning means will not go into operation.

In other words, the mode change-over switch 51 is located inside the car at a place where it will not be immediately obvious. However, the legitimate driver will know where it is and will therefore be able to get into the car and promptly operate the change-over switch 51 to turn off the security circuit 61, while a non-legitimate person who enters the car will take time to find the change-over switch 51.

By taking the estimated difference in time into consideration and assigning a suitable value for the time $T_2$, only the legitimate user will be able to avoid the unintentional setting-off of the warning, while in the case of an illegal intruder who does not know where the change-over switch 51 is hidden, even if he should anticipate that there is such a switch, would exceed the time $T_2$ in looking for it, causing the annunciating means 67 to emit its warning sound.

Preferably, it should be made possible to set the detection sensitivity of the security circuit 61 in the security mode from the outside of the car.

The required sensitivity will differ depending on the size and shape of the passenger compartment, and on the surrounding environment. As such, as a practical product it becomes necessary to set the sensitivity. If this is done inside the passenger compartment R achievement of an accurate setting will be precluded owing to the movements of the person performing the setting being detected.

Figure 5:
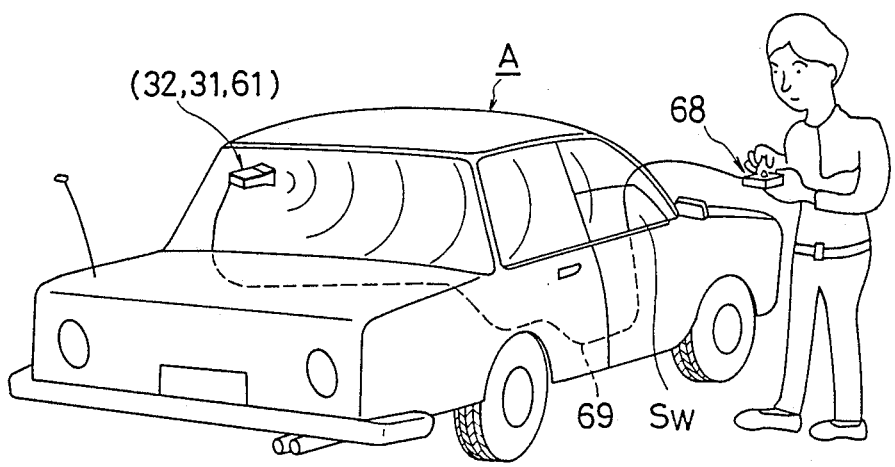

FIGS. 4 and 5 show one possible way to proceed. A sensitivity setting unit 68 for the signal detection circuit 65 of the security circuit 61 shown in FIG. 2 is configured as a remote control unit linked to the main circuits 61 and 65 by a cable 69. When the apparatus is being initially installed, the remote control unit 68 itself is taken out of the car via a slightly-opened door window SW and the appropriate adjustments carried out to set the sensitivity. This arrangement ensures the achievement of the optimum sensitivity setting for any vehicle and vehicle environment.

The remote control concept for sensitivity setting is not limited to the use of a wired means such as via the cable 69. Setting of the sensitivity is also possible using a wireless transmission means based on an infrared beam or other such optical signal transmission means. A person skilled in the art could incorporate a system of the required format by utilizing existing technology that is public knowledge.

When the main portions of the radar detector/security device 30 are arranged together at the rear of the passenger compartment as described, when even in the radar detection mode, warning-mode switchover, volume adjustment or detection itself are not required a control unit 44 that includes a special power switch to avoid unnecessary consumption of the battery 50 may be provided as a remote control unit where it can be easily operated by the driver. This is illustrated in FIG. 4; depending on the case, the control unit 44 may be housed in the same remote control unit as the sensitivity setting unit 68.

When the radar detector/security device is left in the security mode the security circuit 61 has to remain constantly operational until switched off by the change-over switch 51. As such, at night, or for the amount of time it takes to perform some task away from the car as well as when the vehicle is to be left unused for very long periods, it is desirable that as far as possible the battery 50 is not subjected to a large load, otherwise the battery may go flat. Normally the amount of electricity required by the security circuit 61 is very small, relative to the capacity of the battery. However, this cannot be disregarded in conditions that accelerate the weakening or self-discharge of the battery, such as when the vehicle is used in cold regions or is not driven much.

To counter this, the security circuit may be duty-driven, for example. As shown in the case of this embodiment, a power switching circuit 62 comprised of a suitable self-exciting inverter circuit or the like is interposed in the power line that runs from the battery 50 to the security circuit 61, via the change-over switch 51, so that the power can be supplied very intermittently.

Figure 6:
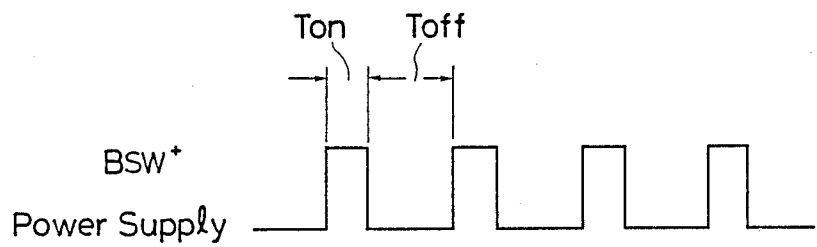
FIG. 6 is an explanatory diagram of the principle waveforms when duty control has been implemented for the security mode of the device.
Figure 6:
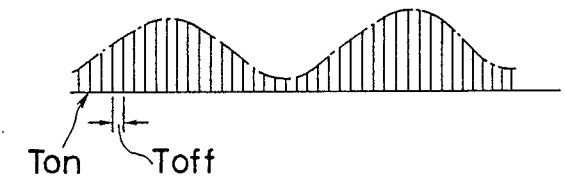
Figure 6:

The waveform involved in such a system is shown in FIG. 6. If the power supply $B_{SW}+$ to the security circuit 61 is interrupted at a predetermined duty ratio $T_{on}/(T_{on}+T_{off})$, consumption per hour of power from the battery 50 relative to when no work is being done can be reduced by an amount that is the reciprocal of the said duty cycle.

Even when this is implemented, the signal representing the above Doppler shift $\Delta f$ is sufficiently detectable. As also shown in FIG. 6, in the case of the above type of duty control of the power supply $B_{SW}+$ being implemented, the waveform of the Doppler shift $\Delta f$ at the point of input $P_i$ to the amplifier 64 provided with a low pass filter becomes a sampling-type waveform. However, if viewed at the output point $P_O$ of the amplifier 64, taking into consideration the integration time constant of the amplifier, it means the input waveform envelope has been detected, so that even though the same duty control is used, just by incorporating the signal detection circuit 65 as an ordinary AM wave detector or peak value detector, the Doppler shift $\Delta f$ is sufficiently detectable.

To advance this idea from a different viewpoint, even if the said duty control did not possess a sufficiently high-speed resolving power relative to the type of hypothetical input signal frequency $\Delta f$ shown in FIG. 6, it can on the other hand help to operate the security circuit 61 every so many seconds or every so many minutes.

The present embodiment envisages the use of the car's horn or of a special siren or the like for the annunciating means 67, but in addition the car's headlamps can be made to flash or come on.

With respect also to the mode change-over switch 51, while the power switching depicted in the drawing is the most preferable one, instead of this, or in addition thereto, a switch may be used whereby the output of the beat detection diode 37 in the mixing chamber 34 is selectively switched between the radar wave circuit 31 side and the security circuit 61 side.

What is claimed is:

1. A car radar detector/security device comprising:
   a horn antenna structure provided with local oscillation means, a horn antenna that radiates a local oscillation frequency from the local oscillation means to the outside and receives radar waves from the outside, and a mixing chamber leading from said horn antenna, said horn antenna structure comprising means to output an intermediate frequency signal as a result of mixing in the mixing chamber an applied frequency signal with said radar wave detected by the horn antenna, means to detect a frequency signal that is reflected from a dielectric body of said local oscillation frequency radiated to the outside via said horn antenna, and means to output a low frequency signal which is a beat of said local oscillation frequency and said feedback frequency signal reflected from said dielectric body which has undergone a Doppler shift produced by the motion of said dielectric body;
   a radar wave detection circuit that detects said intermediate frequency signal output from said horn antenna structure with the detection of said radar wave and operates a warning means;
   a security circuit that detects said low frequency signal that is the beat component produced by said feedback frequency signal and operates an annunciating means; and
   a mode switching means for selecting either the radar detection circuit or the security circuit.

2. A radar detector/security device for cars according to claim 1, wherein:
   electrical power is selectively supplied to said radar wave detecting circuit and said security circuit via said mode switching means, and
   interposed between said mode switching means and said security circuit is a duty circuit that supplies the power intermittently.

3. A radar detector/security device for cars according to claim 1, wherein:
   said security circuit incorporates a signal detection circuit that detects said low frequency signal, said signal detection circuit having variable sensitivity.

4. A radar detector/security device for cars according to claim 3, wherein:
   a sensitivity setting device varies the sensitivity of said signal detection circuit.

* * * * *